Patented Feb. 26, 1935

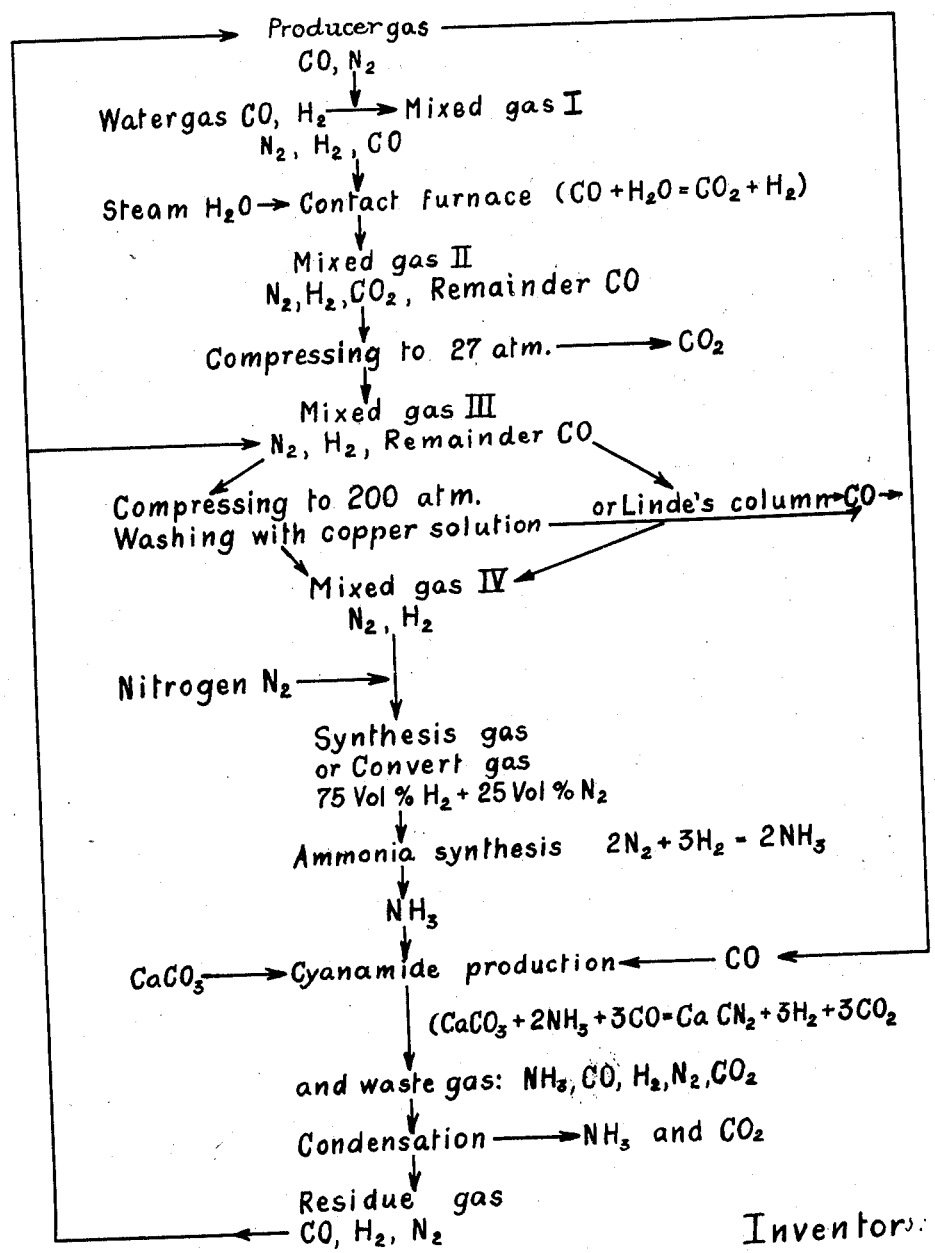

1,992,289

UNITED STATES PATENT OFFICE 1,992,289

PROCESS FOR PREPARING ALKALINE EARTH CYANAMIDES

Nikodem Caro, Berlin-Dahlem, Albert Rudolph Frank, Berlin-Halensee, and Hans Heinrich Franck, Berlin-Charlottenburg, Germany Application February 7, 1930, Serial No. 426,784 In Germany February 8, 1929

6 Claims. (Cl. 23—78)

A known method of preparing synthetic ammonia consists in preparing the initial gas mixture for the ammonia synthesis from coke and steam or from coke and air together or separately. Such a gas mixture consists of hydrogen, carbon monoxide, nitrogen or, in the case of producer gas, only of carbon monoxide and nitrogen. The carbon monoxide contained therein is converted to carbon dioxide and hydrogen by mixing the gases with steam and passing the gas mixture over contact substances and the carbon dioxide removed by compression, for example at 27 atmospheres. The gas, after removing the carbon dioxide, is either compressed to 200 atmospheres and freed from residual carbon monoxide by means of "copper washing" (washing with cuprous salt solution) or separated from carbon monoxide in a Linde separator and then by the careful addition of nitrogen the proportions of the gas mixture are adjusted to 75% by volume of hydrogen to 25% by volume of nitrogen, when the mixture is ready for the contact conversion.

The fixation of the ammonia obtained in this way to fertilizable calcium cyanamide by passing over calcium carbonate at about 600°–800° C. can be effected in the presence of carbon monoxide. The carbon monoxide thereby reacts with the reaction water from the ammonia fixation to form hydrogen. The reaction proceeds rapidly, especially at low temperatures (600°–700°), on adding heavy metals of the first group of the periodic system such as copper salts of the same. The waste gas leaving the furnace, in which the cyanamide formation takes place, contains, for example 51% of ammonia, 29% of carbon monoxide, 7% of hydrogen, 7% of nitrogen, 6.2% of carbon dioxide and, after condensation of the ammonia and the carbon dioxide, 65% of carbon monoxide, 17% of hydrogen and 17% of nitrogen.

It has now been found according to this invention that the precedure of both these manufacturing processes can be considerably simplified by employing the carbon monoxide of the hydrogen production stages for the fixation of the ammonia to cyanamide and by using in the ammonia synthesis the hydrogen formed from the carbon monoxide and water during its passage over the carbonate in the cyanamide formation.

There are two possible methods of obtaining the carbon monoxide:

1. Carbon monoxide from producer gas.
2. Carbon monoxide from the pressure copper washing process or from the Linde separator.

There are also two possible methods for further converting the carbon monoxide-hydrogen waste gas from the cyanamide furnace:

3. In the hydrogen contact furnace.
4. Removal of the hydrogen by means of the pressure copper washing process or the Linde separator.

The combined process may, for example, be carried out as follows (according to 1 and 3):

The carbon monoxide of the producer gas passes, together with ammonia mixture over the calcium carbonate. Calcium cyanamide is formed, and the waste gas contains, after condensation of the ammonia, as already mentioned above, carbon monoxide, hydrogen and nitrogen. This gas mixture passes together with the other initial gas for the ammonia synthesis into the hydrogen contact furnace and the carbon monoxide and water vapor contained therein are almost completely converted into hydrogen and carbon dioxide. The unchanged carbon monoxide, the amount of which can be increased by suitable adjustment of the hydrogen contact furnace, is now separated from the hydrogen by means of the pressure copper washing process or the Linde separator and is available for the formation of fresh cyanamide (cf. 2). The waste gas from the cyanamide formation may, however, also be introduced direct into the pressure copper washing apparatus or the Linde separator, especially when the amount of this gas is small relative to the total gas production in the ammonia synthesis.

The cycle on which the invention is based is illustrated diagrammatically in the flow sheet of the accompanying drawing.

Producer gas, containing nitrogen and carbon monoxide is mixed with water gas containing carbon monoxide and hydrogen to form a mixed gas 1 which is brought into reactive contact with steam in a hydrogen contact furnace. The resultant mixed gas 2 containing nitrogen, hydrogen, carbon dioxide and still a small quantity of carbon monoxide is freed from its carbon dioxide at 27 atmospheres pressure. The resultant mixed gas 3 containing nitrogen, hydrogen and a small quantity of carbon monoxide is freed from its carbon dioxide either in a copper washing apparatus or in a Linde separator, the carbon monoxide being united with the synthetic ammonia and conducted over calcium carbonate. To the mixed gas 4 passing out of the copper washing apparatus, which gas is composed of nitrogen and hydrogen, so much nitrogen is added that the composition of 75% hydrogen and 25% nitrogen necessary for the synthetic gas is attained and synthesized in the ammonia synthesis to form ammonia which is conducted with the above mentioned carbon monoxide over the calcium carbonate. Here calcium cyanamide and a waste gas composed of ammonia, carbon dioxide, carbon monoxide, hydrogen and nitrogen are formed. After separating the ammonia and carbon dioxide the remaining gas composed of nitrogen, hydrogen and carbon monoxide is added either to the mixed gas 1 serving for the ammonia synthesis before this gas passes into the hydrogen contact furnace or to the mixed gas 3 passing out of the hydrogen contact furnace according to the content of carbon monoxide.

The waste gases from the cyanamide reaction, after the ammonia and carbonic acid have been removed, are compressed to the pressure of the hydrogen contact furnace, the pressure copper washing apparatus or the Linde separator according to which stage of the ammonia synthesis they are introduced.

The quantitative proportions are shown in the following example.

In the preparation of calcium cyanamide from ammonia and carbon monoxide the quantity of carbon monoxide passed through amounts, depending on the percentage proportion of $CO:NH_3$ employed, to about 5–10 cubic metres per kg. of $N(CaCN_2)$. Of this quantity employed there is, however, used up during the $CO_2$ or $H_2$ formation respectively the quantity, fairly constant for all proportions of $CO:NH_3$, of 2–2.5 cubic metres per kg. of $N(CaCN_2)$. If, therefore, the CO is passed into the cyanamide formation stage, the waste gas contains for every kilogram of N in the calcium cyanamide a quantity of hydrogen amounting to 2.5 cubic metres. If the gas freed from the nitrogen compounds is now allowed to pass into the pressure copper washing apparatus under 10 to 20 atmospheres these 2.5 cubic metres of hydrogen are directly available in a pure form for the ammonia synthesis and here also result in exactly 1 kg. of nitrogen, this time in the form of $NH_3$. The CO returns into the cyanamide process and must be replaced in full by the addition of 2.5 cubic metres of fresh gas. The synthesized $NH_3$ itself also serves for the formation of cyanamide.

The combination according to this invention offers the following advantages:

The carbon monoxide in the formation of calcium cyanamide from ammonia and calcium carbonate serves only as an equilibrium displacer by removing the water of reaction; it is converted thereby to carbon dioxide and hydrogen. An increasing amount of carbon monoxide in the ammonia results in an increasing percentage formation of cyanamide. The resulting gas, which contains 20–30% of the hydrogen originated according to the water gas equation from the carbon monoxide which has been introduced, is particularly pure, as the calcium carbonate acts automatically as a purifier. It is, therefore, particularly suitable for the ammonia synthesis cycle. A definite stage of operation, which occurs in both processes is, therefore, entirely or partially combined into one process according to this invention.

We claim:—

1. Process for the production of calcium cyanamide from calcium carbonate, carbon monoxide and synthetic ammonia, consisting in separating carbon monoxide from an initial gas for the ammonia synthesis containing nitrogen, hydrogen and carbon monoxide, in synthesizing the hydrogen and nitrogen to ammonia, in causing the ammonia with admixture of carbon monoxide to react with calcium carbonate, in separating the ammonia and carbon dioxide from the resultant gas, in separating the remaining gas into hydrogen and carbon monoxide, and in employing the separated hydrogen for the ammonia synthesis and the separated carbon monoxide for the production of cyanamide.

2. Process for the production of calcium cyanamide from calcium carbonate, carbon monoxide and synthetic ammonia, consisting in causing the carbon monoxide from an initial gas for the ammonia synthesis containing nitrogen, hydrogen and carbon monoxide to react with steam in a hydrogen contact furnace, in separating the resultant carbon dioxide and monoxide, in synthesizing the remaining gas containing nitrogen and hydrogen to form ammonia, in causing the ammonia with admixture of carbon monoxide to react with calcium carbonate, in separating the ammonia and carbon dioxide from the resultant gas, in feeding the remaining gas to the initial gas containing carbon monoxide, hydrogen and nitrogen before passing through the hydrogen contact furnace, in separating the converted carbon monoxide from the gases leaving this furnace and causing the same together with ammonia to react with calcium carbonate.

3. Process for the production of calcium cyanamide from calcium carbonate, carbon monoxide and synthetic ammonia, consisting in causing the carbon monoxide from an initial gas for the ammonia synthesis containing nitrogen, hydrogen and carbon monoxide to react with steam in a hydrogen contact furnace, in separating the resultant carbon dioxide and monoxide, in synthesizing to ammonia the resultant gas containing nitrogen and hydrogen, in causing the ammonia with an admixture of carbon monoxide to react with calcium carbonate, in separating the ammonia and carbon dioxide from the resultant gas, in compressing the remaining gas and feeding same to the ammonia synthesis gas posterior the hydrogen contact furnace, and in separating the unconverted carbon monoxide from the gases leaving this furnace and causing the same together with ammonia to react with calcium carbonate.

4. A process for the production of calcium cyanamide from calcium carbonate, carbon monoxide and synthetic ammonia, comprising the stages of passing ammonia and carbon monoxide into reactive contact with calcium carbonate, removing ammonia and carbon dioxide from the resulting gases, conducting the remaining gas into a hydrogen contact furnace in reactive contact with steam and initial gas for the ammonia synthesis containing carbon monoxide and nitrogen, separating the carbon dioxide from the gases issuing from the furnace, compressing these gases to the pressure of a pressure copper washing apparatus and passing them through this pressure copper washing apparatus to there separate these gases into hydrogen and unconverted carbon monoxide, and in employing the separated hydrogen for the ammonia synthesis and the separated carbon monoxide for the production of cyanamide.

5. A process for the production of calcium cyanamide from calcium carbonate, carbon monoxide and synthetic ammonia, comprising the stages of passing synthetic ammonia and carbon monoxide into reactive contact with calcium carbonate, removing ammonia and carbon dioxide from the resulting gases, conducting the remaining gas into a hydrogen contact furnace in reactive contact with steam and initial gas for the ammonia synthesis containing carbon monoxide and nitrogen, separating the carbon dioxide from the gases issuing from the hydrogen contact furnace, freeing the resultant gases containing carbon monoxide, hydrogen and nitrogen from carbon monoxide and in employing the separated hydrogen and nitrogen for the ammonia synthesis and the separated carbon monoxide for the production of cyanamide.

6. A process for producing calcium cyanamide from calcium carbonate, calcium monoxide and synthetic ammonia, comprising on the one hand the stages of conducting initial gas for the ammonia synthesis containing nitrogen and carbon monoxide into a hydrogen contact furnace in reactive contact with steam, separating the carbon dioxide from the gases issuing from the hydrogen contact furnace, and on the other hand the stages of passing synthetic ammonia and carbon monoxide into reactive contact with calcium carbonate, removing ammonia and carbon dioxide from the resulting gas, bringing the remaining gas to the pressure of the initial gas for the ammonia synthesis after this initial gas has passed through the hydrogen contact furnace and uniting both gases, separating the unconverted carbon monoxide from the gases and employing the separated hydrogen and nitrogen for the ammonia synthesis and the separated carbon monoxide for the production of cyanamide.

NIKODEM CARO.
ALBERT R. FRANK
HANS HEINRICH FRANCK.